(12) United States Patent
Andreoli

(10) Patent No.: US 8,407,163 B2
(45) Date of Patent: Mar. 26, 2013

(54) MONITORING A DEVICE, NETWORK, OR SYSTEM WITH ADAPTIVE DYNAMIC CLASSIFICATION EMPLOYING A HIDDEN MARKOV MODEL OPERATING ON A TIME SEQUENCE OF INFORMATION

(75) Inventor: Jean-Marc Andreoli, Meylan (FR)

(73) Assignee: Xerox Corporation, Norwalk, CT (US)

( * ) Notice: Subject to any disclaimer, the term of this patent is extended or adjusted under 35 U.S.C. 154(b) by 881 days.

(21) Appl. No.: 12/548,535

(22) Filed: Aug. 27, 2009

(65) Prior Publication Data

US 2011/0055122 A1    Mar. 3, 2011

(51) Int. Cl.
*G06F 15/18* (2006.01)
*G06F 15/16* (2006.01)
*G06N 5/02* (2006.01)

(52) U.S. Cl. ........................................... 706/12
(58) Field of Classification Search ............ 706/12; 704/250; 370/241
See application file for complete search history.

(56) References Cited

U.S. PATENT DOCUMENTS

| 6,694,044 | B1 | 2/2004 | Pavlovic et al. | |
|---|---|---|---|---|
| 2004/0059966 | A1 | 3/2004 | Chan et al. | |
| 2006/0153083 | A1* | 7/2006 | Wallenius | 370/241 |
| 2009/0144059 | A1* | 6/2009 | Yu et al. | 704/256.1 |

OTHER PUBLICATIONS

Conroy et al., "Using HMM and Logistic Regression to Generate Extract Summaries for DUC," In Proc. of Document Understanding Conference, New Orleans, La, US (2001).

Dempster et al., "Maximum Likelihood from Incomplete Data via the EM Algorithm," Journal of the Royal Statistical Society, B(39):1-38 (1977).
Domingos et al., "On the Optimality of the Simple Bayesian Classifier under Zero-One Loss," Machine Learning, 29:103-130 (1997).
Fraser et al., "Hidden Markov Models with Mixed States," Time Series Prediction: Forecasting the Future and Understanding the Past, pp. 264-281 (1994).
Fu et al., "On Mixtures of Linear SVMs for Nonlinear Classification," Lecture Notes in computer Science, vol. 5342, Orlando, FL (2008).
Galassi et al., "Incremental Construction of Structured Hidden Markov Models," Lecture Notes in Computer Science, vol. 4733/2007, pp. 798-803 (2007).
Ghahramani et al., "Variational Learning for Switching State-Space Models," Neural Computation, 12(4):831-864 (2000).
Gunawardana et al., "Convergence Theorems for Generalized Alternating Minimization Procedures," Journal of Machine Learning Research, 6:2049-2073 (2005).

(Continued)

*Primary Examiner* — Jeffrey A Gaffin
*Assistant Examiner* — Ola Olude-Afolabi
(74) *Attorney, Agent, or Firm* — Fay Sharpe LLP

(57) ABSTRACT

In a monitoring method, a time sequence of information pertaining to a monitored device, network, or system is recorded, comprising observations of the monitored device, network, or system and known prior correct action recommendations for the monitored device, network, or system. A hidden Markov model (HMM) operating on the time sequence of information is maintained. The HMM comprises a hidden state of the monitored device, network, or system. A current state of the monitored device, network, or system is classified using a classification value comprising an emission of the HMM that depends on an estimate of the distribution of the hidden state and on a selected portion of the time sequence of information. An action recommendation is generated for the current state of the monitored device, network, or system based on the classification value.

18 Claims, 3 Drawing Sheets

OTHER PUBLICATIONS

Jaakkola et al., "A variational approach to Bayesian logistic regression models and their extensions," In Proc. of 6th Intl. Workshop on Artificial Intelligence and Statistics, Fort Lauderdale, FL, US (1997).

Ng et al., "On Discriminative vs. Generative classifiers: A comparison of logistic regression and naive Bayes," Proc. of 14th Advances in Neural Inforamtion Processing Systems, Vacouver, BC, Canada, MIT Press (2001).

Rabiner, "A Tutorial on Hidden Markov Models and Selected Applications in Speech Recognition," Proceedings of the IEEE, 77(2):257-286 (1989).

Schwartz, "Estimating the Dimension of a Model," Annals of Statistics, 6(2):461-464 (1978).

Roweis, "Constrained Hidden Markov Models," Neural Information Processing Systems 12 (NIPS '99) pp. 782-788 (1999).

Quattoni et al., "Hidden-state Conditional Random Fields," IEEE Transactions on Pattern Analysis and Machine Intelligence, pp. 1-7 (2007).

Thiesson et al., "Arma time-series modeling with graphical models," Proc. of 20th Conference on Uncertainty in Artificial Intelligence, Banff, Al, Canada (2004).

Bunks, C. et al., "Condition-Based Maintenance of Machines Using Hidden Markov Models", Mechanical Systems and Signal Processing, Jul. 2000 Academic Press, vol. 14, No. 4, Jul. 2000, pp. 597-612, XP002637757.

Sutter, M.T. et al., "Designing Expert Systems for Real-Time Diagnosis of Self-Correcting Networks", IEEE Network, IEEE Service Center, New York, New York, vol. 2, No. 5, Sep. 1988, pp. 43-51, XP000007771.

* cited by examiner

MONITORING A DEVICE, NETWORK, OR SYSTEM WITH ADAPTIVE DYNAMIC CLASSIFICATION EMPLOYING A HIDDEN MARKOV MODEL OPERATING ON A TIME SEQUENCE OF INFORMATION

BACKGROUND

The following relates to the monitoring arts, classification arts, and related arts, and finds particular application in printing network monitoring arts, electronic network monitoring arts, device network monitoring arts, and so forth.

Monitoring of networks and systems is a common task. As an illustrative example, a network of printers may be monitored, with selected normal or abnormal events logged. The monitoring system is typically a computer (for example, a network server or the like) that occasionally polls a monitored device, network, or system in order to acquire information that is recorded in a monitoring log at the computer or at a storage device in operative communication with the computer. In addition to or instead of polling, the monitored device, network, or system may instead generate log information that is pushed to the monitoring system and recorded in the monitoring log. In either case, the monitoring log stores discrete observations that are time stamped with the acquisition time. The content of the observations may include, for example: sensor readings; operational events (for example, number of color print jobs executed in the case of a printing device); operational status (for example, "on" or "standby" in the case of a printing device); or so forth.

To be useful, the information of the monitoring log should be assessed at the monitoring system to ascertain whether the monitored device, network, or system is fully operational, or partially operational (for example, a multi-function printing device may be partially operational if the device operates in printing mode but not in optical scanning mode due to a malfunctioning optical scanner), or non-operational. A partial malfunction such as a broken optical scanner may be detected directly (for example, by a sensor that indicates the malfunction) or indirectly (for example, based on a sudden cessation of executed optical scanning jobs by the device). In a process control approach the monitoring log is assessed and the device, network, or system is adjusted automatically based on the assessment of the monitoring log.

Process control approaches are not effective if there is no way to automatically adjust the monitored device, network, or system. For example, a malfunctioning printing device generally cannot be automatically fixed, but rather a human repair person is dispatched to repair the printing device. Process control approaches may also be less effective if decisions to be made based on the monitoring log are not immediately known. For example, a decrease in the number of print jobs executed by a printing device may be an indication of a partial malfunction (such as, for example, the printing device producing printouts with extraneous lines, which may be acceptable for draft prints but not for final documents); on the other hand, the decrease in the number of print jobs executed may be due to other factors such as one or more users being out of the office.

In such cases, it could nonetheless still be advantageous to assess the monitoring log in order to make a decision as to whether action is needed, or whether a particular action should be taken. Such assessment can lead to more efficient deployment of human resources (for example, human repair persons or teams), or more accurate decisions of high consequence (for example, a decision to shut down a power generation plant of an electrical grid), or so forth.

BRIEF DESCRIPTION

In some illustrative embodiments disclosed as illustrative examples herein, a monitoring method comprises: recording a time sequence of information pertaining to a monitored device, network, or system comprising observations of and actions taken respective to the monitored device, network, or system; maintaining a hidden Markov model (HMM) operating on the time sequence of information and comprising a hidden state of the monitored device, network, or system; classifying a current state of the monitored device, network, or system using a classification value comprising an emission of the HMM that depends on the hidden state and on a selected portion of the time sequence of information; and generating an action recommendation for the current state of the monitored device, network, or system based on the classification value; wherein at least the maintaining and the classifying are performed by a digital processor.

In some illustrative embodiments disclosed as illustrative examples herein, a monitoring system comprises: a monitoring module configured to maintain a monitoring log recording a time sequence of information pertaining to a monitored device, network, or system comprising observations of and actions taken respective to the monitored device, network, or system; and a classifier module configured to generate an action recommendation classification based on an estimate of the distribution of a current hidden state of the monitored device, network, or system, a current observation of the monitored device, network, or system, and a selected portion of the time sequence of information prior to the current observation of the monitored device, network, or system.

In some illustrative embodiments disclosed as illustrative examples herein, a storage medium stores instructions executable by a digital processor to perform an assessment process for assessing a time sequence of information pertaining to a monitored device, network, or system comprising observations of the monitored device, network, or system and actions taken respective to the monitored device, network, or system. The assessment process comprises: classifying a current state of a monitored device, network, or system based on an estimate of the distribution of a current hidden state of the monitored device, network, or system and a representation of fixed dimensionality of a current observation and a selected portion of the time sequence of information preceding the current observation in the time sequence; and generating an action recommendation based on the classifying.

DETAILED DESCRIPTION

Figure 1:
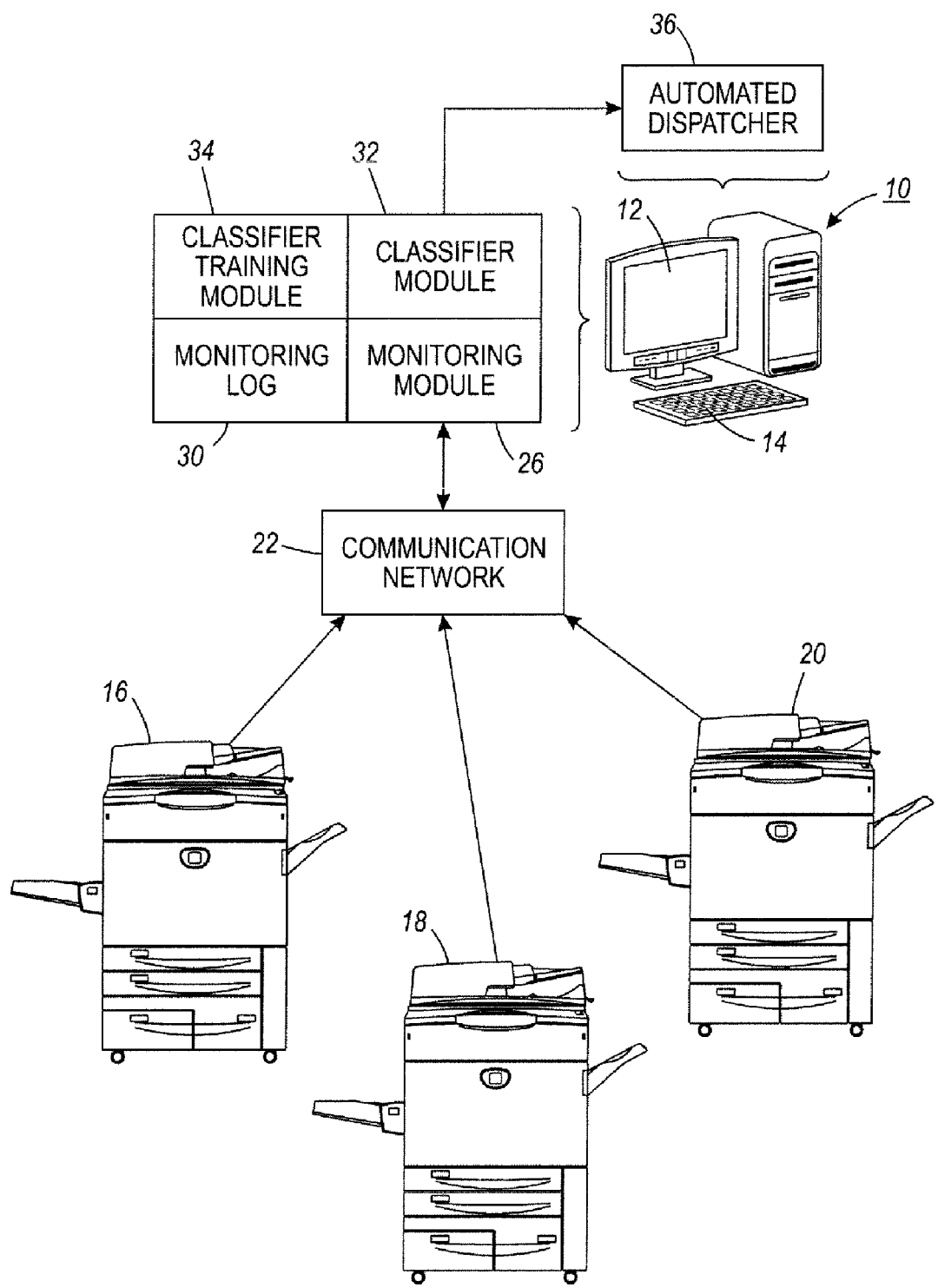
FIG. 1 diagrammatically shows a monitoring system embodied as a computer configured to monitor a printer network.

With reference to FIG. 1, an illustrative monitoring system embodied by a computer 10 including a display 12 and keyboard 14 and/or mouse and/or other user input device monitors a printing network. The printing network includes a plurality of printing devices 16, 18, 20 (one, some, or all of which may be multifunction printing devices with additional capability such as optical scanning, facsimile transmission, or so forth) that are networked with the monitoring system computer 10 by a communication network 22 such as the Internet, a local area network (LAN), a wireless local area network (WLAN), some combination thereof, or so forth. The illustrative computer 10 can in general be replaced by any suitably configured digital processing device that includes a digital processor (not shown) that can be variously embodied, such as by a single-core processor, a dual-core processor (or more generally by a multiple-core processor), a digital processor and cooperating math coprocessor, a digital controller, graphical processing unit (GPU), or so forth. By way of example, the illustrated computer 10 is a desktop or laptop computer including user interfacing components 12, 14. Other user interfacing devices, such as a second monitor, a mouse or trackball, or so forth can also be included. By way of additional example, the illustrated computer 10 can be replaced by another digital processing device such as a network server having only network interfacing (for example, Internet or local area network (LAN) interfacing), or so forth.

The computer 10 is configured by suitable programming, firmware, or so forth to embody the illustrative monitoring system which includes a monitoring module 26 that acquires discrete observations respective to the monitored network or devices 16, 18, 20. The monitoring module 26 may acquire discrete observations by actively requesting the information (for example, by actively polling the devices 16, 18, 20) or may acquire discrete observations by passively receiving the information pushed to the computer 10 by the devices 16, 18, 20, or by some combination of push and pull acquisition operations. The acquired observations are time stamped with the acquisition time and stored in a monitoring log 30 on a digital storage device (not illustrated; may be internal or external respective to the computer 10) such as a hard drive, optical storage medium, electronic storage medium, or so forth. In the illustrative embodiment, the acquired observation for a printer may, by way of example, include one or more of the following: one or more sensor readings pertaining to toner level, temperature, or other diagnostic parameters; an operational status indicator (for example, having a first value indicating "active", a second value indicating "standby", or so forth); one or more diagnostic parameters indicating, for example, the operational state of components such as an optical scanner, a toner cartridge, and so forth); print media tray indicators (for example, having possible values of "loaded" or "empty"); and so forth.

It is to be appreciated that the foregoing are merely illustrative examples. In general, the monitoring system may monitor any type of device, network, or system. By way of example, some other contemplated monitored devices, networks, or systems include: a power generation facility (for example, a power station or sub-station, or a power grid of power stations, sub-stations, and the like); one or more heating, ventilating, and air conditioning (HVAC) systems and/or components thereof; a network of computers used by office workers; or so forth. As already noted, the monitoring system itself may be variously embodied by one or more digital processing devices.

The monitoring system embodied by the illustrative computer 10 further includes a classifier module 32 which classifies the state of each monitored network or device 16, 18, 20. The classifier module 32 updates the classification when the monitoring module 26 logs an additional observation for the network or device. As disclosed herein, the classifier module 32 employs an adaptive dynamic classifier that generates an informative classification such as a binary classification in which a first binary value represents "device satisfactory" and a (different) second binary value represents "device may have a problem". The adaptive dynamic classifier module 32 employs a parameterized classifier using parameters suitably trained by a classifier training module 34. For example, as disclosed herein the classifier training module 34 may employ a set of independent time sequences extracted from the monitoring log 30 as training data sequences for learning the parameters of the parameterized classifier used by the classifier module 32.

The informative classification is optionally provided to a human service dispatcher via the display 12 or another user interface. For example, the display may show a green indicator whenever the device classification is "device satisfactory" and the indicator may switch to a flashing and/or red indicator whenever the device classification is "device may have a problem". Typically, it is expected that the human dispatcher will then perform some remote investigation and possibly dispatch a repair person or team of repair persons to the device which is indicated as possibly having a problem.

Alternatively, an automated dispatcher module 36 embodied by the computer 10 (as diagrammatically illustrated) or by another digital processing device may be employed. In such embodiments, the human perceptible display of the informative classification (the illustrative described green or red or flashing indicator) is optionally omitted—rather, the informative classification serves as a data input to the automated dispatcher 36 which takes remedial action for the classification "device may have a problem" such as automatically dispatching a human repair person or team, or running (further) automated diagnostics.

The informative classification is also optionally logged in the monitoring log 30. This can be used to assess the accuracy of the classifier module 32 by comparing the informative classification with corresponding "ground truth" information such as (in the illustrative example) a record of the actual operational state of the device, which is also optionally stored in the monitoring log 30. It will be appreciated that this "ground truth" information is also suitably used by the classifier training module 34 in training the classifier module 32.

In some variant embodiments, the training module 34 and the classifier module 32 may be embodied by different digital processing devices. For example, the training module 34 may be embodied by a vendor-owned computer located at a product vendor location, while the classifier module 32 may be embodied by an end user-owned computer located at an end user location different from the vendor location. It will be further appreciated that the disclosed classifier and classifier training components 32, 34 can also be embodied as a storage medium storing instructions which when executed on the illustrated computer 10 or on another digital processing device or devices perform the disclosed classifier operations. The storage medium (not shown) may be, for example: a hard disk or other magnetic storage medium; an optical disk or other optical storage medium; a random access memory (RAM) chip or set of RAM chips; a read-only memory (ROM) chip or set of ROM chips; a FLASH memory; or so forth. The storage medium may be integral with the computer 10 (for example, an internal hard drive or RAM), or may be separate (for example, an external hard drive operatively connected with the computer 10), or may be separate and accessed via a digital data network such as a local area network (LAN) or the Internet (for example, as a redundant array of inexpensive or independent disks (RAID) or other network server storage that is indirectly accessed by the computer 10 via a digital network).

In the following, some illustrative examples of the classifier and classifier training components 32, 34 are described.

As used herein, it is to be understood that "optimization", "minimization", and similar phraseology are to be broadly construed as one of ordinary skill in the art would understand these terms. For example, these terms are not to be construed as being limited to the absolute global optimum value, absolute global minimum, or so forth. For example, minimization of a function may employ an iterative minimization algorithm that terminates at a stopping criterion before an absolute minimum is reached. It is also contemplated for the optimum or minimum value to be a local optimum or local minimum value.

The classifier module 32 makes action recommendations respective to remedial actions directed to the monitored devices, network, or system 16, 18, 20. In some embodiments, the action recommendation is selected from a binary group comprising: (i) no action recommended, and (ii) a remedial action comprising at least investigation should be undertaken for the monitored device, network, or system 16, 18, 20. It is assumed that there exists a ground truth, that is, a correct recommendation or reference decision.

In the following, X and Y represent random variables modeling, respectively, the observation (sometimes referred to as an event) and the corresponding correct recommendation or reference decision (the action, which may in some embodiments include the possible action of "no action taken"). Variable X exists in a complex structured space which may involve both discrete and continuous components (for example, results of self-diagnosis procedures, counts, sensor readings, delays, or so forth). Variable Y has two possible values, denoted herein as "−1" and "+1". The generation of an action recommendation can therefore be viewed as a classification problem in which the goal is to find a predictor $\hat{Y}$, which is a (deterministic) function from the data space of the observation random variable X into the binary class space of the action random variable Y which minimizes the expected loss.

Figure 2:
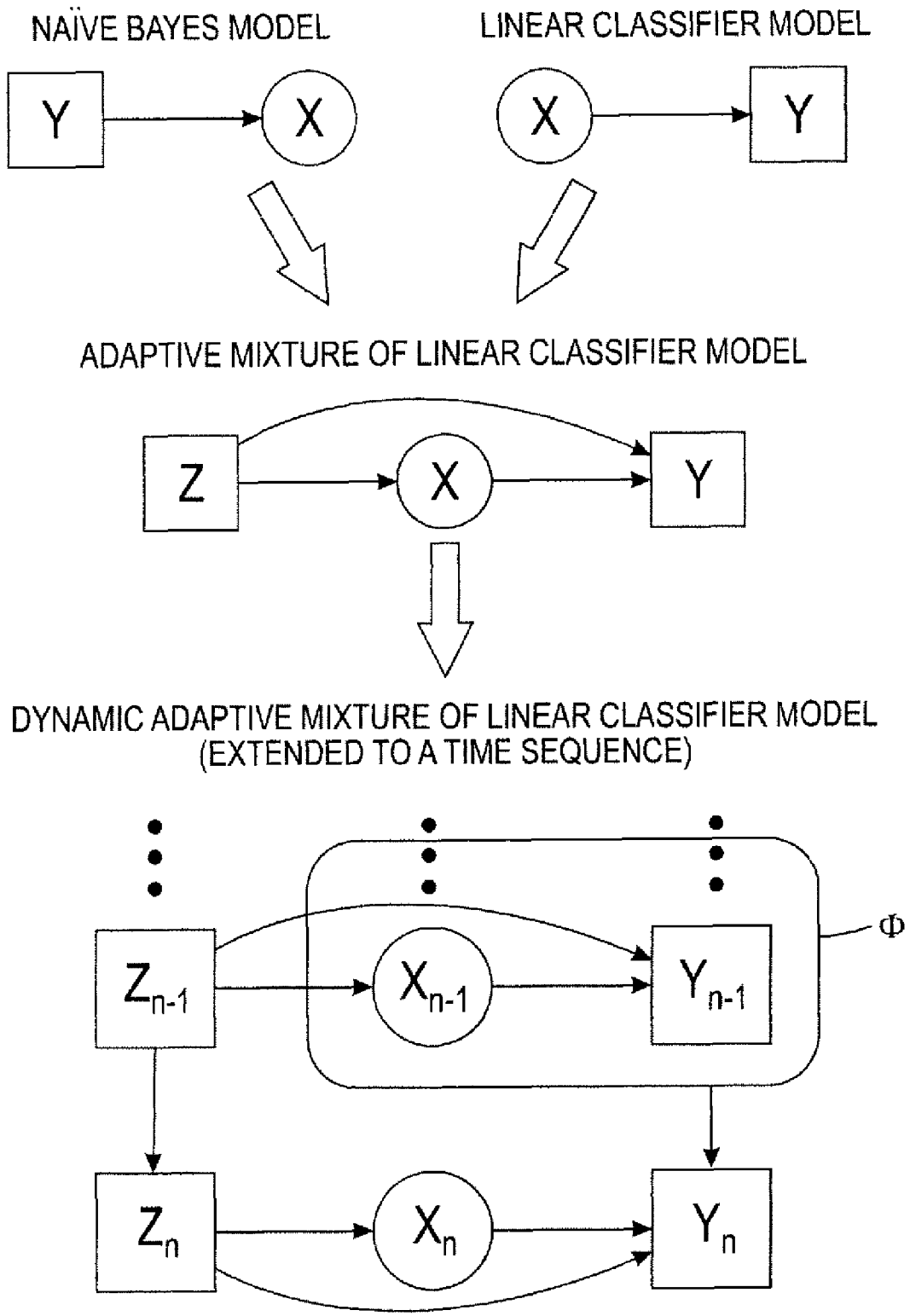
FIG. 2 diagrammatically shows construction of the classifier module of the monitoring system of FIG. 1.

With reference to FIG. 2, development of the disclosed adaptive dynamic classification approaches operative on time sequences is described starting with simpler static classification approaches operative on static random variables that do not vary in time. The topmost and leftmost diagram of FIG. 2 relates to the naïve Bayes approach, which implicitly identifies the class Y with a state of the problem, such that whenever the problem is in a given state, X can be decomposed into independent observations which can be learnt separately. The graphical model is shown in FIG. 2. The distribution of Y is a Bernouilli and that of X|Y is the independent product of component distributions $X^{(d)}|Y$ for $d=1:D$ where D is the dimensionality of the observation space of the observation random variable X. Each distribution $X^{(d)}|Y$ depends on the nature of component $X^{(d)}$ and has an associated parameter in the naïve Bayes model. For a multinomial, it is the stochastic vector of probabilities (dimension equal to the cardinality of the range). For a Poisson distribution, it is a scalar (the mean of the distribution). For a Normal or LogNormal distribution, it is a pair of scalars (mean and variance). Other statistical distributions can also be used in the naïve Bayes model approach.

The idea of a "state" of the problem is advantageous as it corresponds to an abstraction of the state of the monitored system, which is the source of the observed events. On the other hand, it is generally insufficient to equate the decision to be made with the state, as in the naïve Bayes approach. As recognized herein, a better approach is to identify the state with some structure capturing rationale leading to the decision, but not the decision itself.

With continuing reference to FIG. 2, other approaches comprise the linear classification approaches, which assume that the form of the predictor is defined by a hyperplane in the space of the observation random variable X. If the observations X include discrete components, these can be accommodated by adding a continuous dimension for each possible value of the discrete component. Logistic regression is a typical example of a linear classifier, and its graphical model is shown in the topmost and rightmost diagram of FIG. 2.

In the linear classification approaches, the distribution of X does not need to be known a priori since it is observed, and the distribution of Y|X is a Bernouilli distribution whose parameters are determined by a linear combination of the components of X plus the intercept. A problem with linear classification approaches is that they do not utilize information about the distribution of X. This is problematic because information about the distribution of X gives information about the possible states of the monitored device, network, or system, and therefore information is effectively lost.

With continuing reference to FIG. 2, the naïve Bayes and linear classifier approaches are combinable to generate an adaptive mixture of linear classifiers model, as shown in FIG. 2. This combines the idea of a state on which independent components of the observation stochastically depend, as in naïve Bayes approach, and the simple shape of a linear classifier. Toward this end, a hidden state variable Z is introduced, which ranges over a finite space of K possible states. The model is shown in FIG. 2. The distribution of Z is a multinomial, that of X|Z is the product of independent component distributions $X^{(d)}|Z$ as in the naïve Bayes case, and Y|X Z is a Bernouilli distribution whose parameters are determined by a linear combination of the components of X plus the intercept, but where the coefficients of the combination depend on Z: there is one vector of coefficients for each possible state of Z. In effect, the state Z selects the coefficients of the linear classifier. Variable Z thus identifies a cluster of observations, and each cluster has its own specific linear classifier for the decision. Viewed yet another way, the adaptive mixture of linear classifiers model draws the decision Y from a mixture of linear classifiers whose components are themselves clusters of observations X.

The naïve Bayes, linear classifier, and adaptive mixture of linear classifiers models just described with reference to FIG. 2 are static models that do not incorporate a time sequence. On the other hand, monitoring such as that performed by the monitoring module 26 of FIG. 1 produces data in the form of time series. The action recommendation at a given time might reasonably be expected to be influenced not only by the current state of the device, network, or system, but also by past events (that is, past observations), and even by the past reference decisions, assuming they are known for the past events.

Knowledge of past reference decisions (that is, the "correct" recommendation at a given point in time in the past) is typically known in the case of binary decisions because the observer sees the consequences of its previous decisions and can thereby infer, immediately or shortly after having applied the decision, whether the action recommendation was correct or incorrect. This is referred to herein as the "immediate disclosure" assumption—it is assumed that the correct recommendation (i.e., reference decision) is known for all past events (but obviously not for the current event).

For example, consider an illustrative case in which the possible action recommendations include "do not act" or "perform remedial action including at least investigation". If the recommendation is to investigate, it is not known at the time this decision is made whether or not it is correct. However, once the investigation is performed it will quickly become manifest whether the investigation was warranted, and hence whether the recommendation to investigate was the correct recommendation. On the other hand, if the recommendation is "do not act", whether this was the correct recommendation will become manifest shortly thereafter because either nothing bad will happen (in which case the recommendation to not act was correct) or because of some bad effect occurs (in which case the recommendation to not act was not correct).

With continuing reference to FIG. 2, it is desired to extend the adaptive mixture of linear classifiers model to the case of a time sequence. In the following, the time sequence is indexed by a parameter n where n denotes the current time and n-1, n-2, ... represent prior times. Thus, the current observation is denoted $X_n$ while the immediately observation immediately preceding in time is denoted $X_{n-1}$ and so forth. The correct action recommendations are similarly denoted $Y_n$, $Y_{n-1}$, ..., where $Y_n$ is the current action recommendation to be made (and hence is not known but is to be determined by the model). Under the immediate disclosure assumption, it is assumed that prior (correct) action recommendations $Y_{n-1}$, $Y_{n-2}$, ..., are known. In this case, the dependence Y|X for the static case is replaced by the dynamic dependence $Y_n|X X_n$, $X_{n-1}$, .... Moreover, the known prior (correct) action recommendations $Y_{n-1}, Y_{n-2}, \ldots$ can also be useful information for the inference, so that the inference model is given by $Y_n|X_n$, $X_{n-1}, \ldots, Y_{n-1}, Y_{n-2}, \ldots$. Further allowing for the hidden state variable Z the inference model can be written as $Y_n|X_n$, $X_{n-1}, \ldots, Y_{n-1}, Y_{n-2}, \ldots, Z_n$ where $Z_n$ is the current state of the hidden state variable Z.

With continuing reference to FIG. 2, in practice it is not computationally convenient to include all past information $X_n, X_{n-1}, \ldots, Y_{n-1}, Y_{n-2}, \ldots$ in the inference model, because this information is of variable length and constantly enlarging as the monitoring process proceeds. Accordingly, an aggregator Φ is employed to select a portion of the time sequence of information for use in the inference. The final model is depicted at the bottom of FIG. 2, where the aggregator Φ is diagrammatically represented by a selection box enclosing the selected portion of the time sequence of information that is used in the inference of the current action recommendation $Y_n$. The aggregator Φ selects the portion of the time sequence of information to be used in the inference and formats it into a representation of fixed dimensionality, such as a vector of a fixed number of components. More generally, the aggregator Φ is a deterministic function, optionally controlled by one or more parameters, which takes as input the time sequence of information $X_n, X_{n-1}, \ldots, Y_{n-1}, Y_{n-2}, \ldots$ of arbitrary length and produces as output a representation of a selected portion of that sequence in a fixed feature space, that is, of a fixed dimensionality.

In some illustrative embodiments, the aggregator Φ is a sliding window aggregator. The sequence to aggregate is suitably represented as $(t_i, u_i)_{i=1}^n$ including for each item i a time stamp $t_i$ and a fixed length vector $u_i$. The sequence is assumed sorted by increasing timestamps (in the simplest case, $t_i=i$, the index in the sequence). The sliding window aggregator is controlled by two parameters, referred to herein as the window size (denoted r) and the decay rate (denoted α), and is defined by:

$$\Phi((t_i, u_i)_{i=1}^n; r, a) = \left\langle u_n; \ldots ; u_{n-r+1}; t_n-t_{n-1}; \ldots ; t_n - t_{n-r+1}; \frac{\sum_{i=1}^{n-r} \exp(at_i) u_i}{\sum_{i=1}^{n-r} \exp(at_i)} \right\rangle. \quad (1)$$

The aggregated representation of Equation (1) includes a concatenation of: (i) the last r vectors of the time sequence of information (that is, the vectors within the window r); (ii) for each of the window vectors except the last one, their time distance to the last one; and (iii) a weighted sum of all remaining vectors, before the window in the time sequence of information, wherein the weights are chosen such that items decay with time, and α represents the rate at which older items lose weight in the sum. Optionally, the decay portion is omitted, and the sliding window aggregator is $\Phi((t_i, u_i)_{i=1}^n; r, \alpha) = \left\langle u_n; \ldots ; u_{n-r+1}; t_n-t_{n-1}; \ldots ; t_n-t_{n-r+} \right\rangle$ with only the window size parameter r. In either case, the sliding window aggregator can be computed efficiently by induction for all the prefix subsequences of a given sequence, using computationally simple shift and arithmetic operations, and without recomputing each time the two sums in the last component.

In one approach for extending the adaptive mixture of linear classifiers model to a time sequence of information, the static term X is replaced by the aggregation of $X_{1:n}$, for example using a sliding window aggregator. However, in that case, the assumption that in a given state Z, the components of X are independent becomes unreasonable. Indeed, X would now contain r consecutive values of each component of the event vector. To ensure that, conditionally to the state, all these consecutive values are independent would entail an unmanageable number of states, which would characterize not only an abstraction of the state of the monitored system at the time of the observation, but also an abstraction of its most recent evolution.

As an alternative approach, it is disclosed herein to keep the original observation vector X reduced to the event vector, and transform the graphical model to account for the sequence structure of the events. This is achieved by assuming hidden Markov dynamics for state Z. Furthermore, since X is observed anyway at each instance, it does not cost anything to make $Y_n$ depend not only on $Y_n Z_n$ as specified by the graphical model, but also on $X_{1:n-1}$. With the immediate disclosure assumption, $Y_n$ can optionally also be made dependent on $Y_{1:n-1}$, still at no cost. In this approach $Y_n$ depends on a variable length sequence of observations, which can be aggregated by a sliding window aggregator or another a suitable aggregator. Although this model introduces a dependency of component Y of the emission on potentially all its predecessors, the Markov dynamics of the states Z is still of order 1. The graphical model becomes that shown in FIG. 2 ("Dynamic Adaptive Mixture of Linear Classifiers Model, Extended to a Time Sequence"), and is equivalent to the following factorization of the generative model:

$$p((XYZ)_{1:m}) = \prod_{n=1}^{m} p(Y_n \mid X_{1:n} Y_{1:n-1} Z_n) p(X_n \mid Z_n) p(Z_n \mid Z_{n-1}). \quad (2)$$

The following characterizations of the conditional dependencies of the graphical model of FIG. 2 are suitable:

$$p(Z_n \mid Z_{n-1}) = p(Z_n \mid Z_{n-1}; \rho), \quad (3)$$

$$p(X_n \mid Z_n) = \prod_{d=1}^{D} p(X_n^{(d)}; \theta_{Z_n d}), \quad (4)$$

and $$p(Y_n \mid X_{1:n} Y_{1:n-1} Z_n) = p(Y_n \mid \Phi(X_{1:n} Y_{1:n-1}; \mu); \beta_{Z_n}). \quad (5)$$

The state dynamics of Equation (2) are controlled by multinomial parameters ρ of Markovian dynamics, including a transition matrix and initial vector of dimension, respectively, K×K and K, with $K^2-1$ degrees of freedom.

The X-emission model of Equation (4) is controlled by a parameter $\theta_{kd}$ for each state k and each component d of X. Each component d is assumed to be generated according to a member of the same family of distributions, whatever the state k, but the member within that family may depend on k. The degree of freedom of parameter $\theta_{kd}$ is therefore independent of k but depends on the chosen distribution family for component d.

The Y-emission model of Equation (5) is controlled by a parameter $\beta_k$ for each state k, which is the vector of coefficients of the chosen linear classification model. Thus, in state k, the binary emission $Y_n$ follows a Bernouilli distribution whose parameter is determined by the scalar product $\beta_k^T \tilde{X}_n$ where $\tilde{X}_n = \Phi(X_{1:n}Y_{1:n-1}; \mu)$ is some aggregate of the past of the event (augmented with an extra component set to 1, which enables the intercept to be accounted for in an elegant fashion). The aggregator $\Phi$, with corresponding parameter $\mu$, can be a sliding window aggregator, but other aggregators are also contemplated. The dimension of $\beta_k$, written $\tilde{D}$, is that of the image space of $\Phi$. In the case of the illustrative sliding window aggregator, $\tilde{D}=(r+1)(D+1)$: one coefficient for each component of each of $X_{n-r+1:n}$ and the summary of $X_{1:n-r}$, one coefficient for each $Y_{n-r+1:n-1}$ and the summary of $Y_{1:n-r}$ plus the intercept.

Optionally, other information coming from external sources could also be aggregated here. For example, such other information could include actual feedback sent to the monitored device, network, or system after each event (if recorded), or the configuration of the device, network, or system (if available), or so forth. In such cases, the dimension $\tilde{D}$ should be modified accordingly.

Given K µ, the total degree of freedom of the overall parameter is therefore:

$$F(K) = K^2 + K\left(\tilde{D} + \sum_{d=1}^{D} \deg(\theta_{\cdot d})\right) - 1. \tag{6}$$

Having set forth a suitable dynamic adaptive classifier for use with a time sequence of information such as the monitoring log 30 generated by the monitoring module 26, some illustrative embodiments are described with reference to FIGS. 3 and 4. These illustrative embodiments make the immediate disclosure assumption. For illustrative purposes, these embodiments employ binary logistic regression (LR) as the linear classifier; however, substantially any other probabilistic linear classifier would work as well. In a LR model, if x is the input (with an extra component set to 1) and y the output (in $\{-1,1\}$), then $p(y|x)=\sigma(y\beta^T x)$ where $\beta$ is the vector of coefficients (including intercept) and v denotes the logistic (sigmoid) function.

Figure 3:
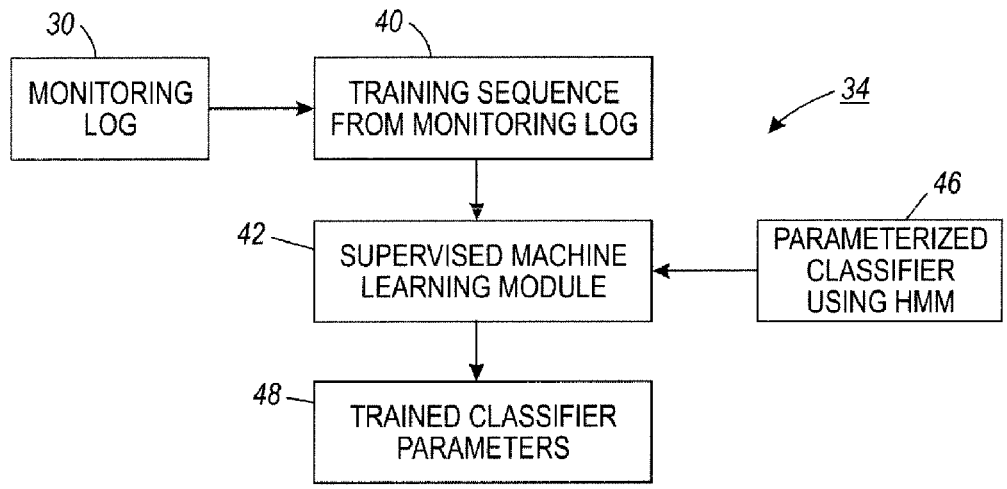
FIG. 3 diagrammatically shows the classifier training module of FIG. 1.

With reference to FIG. 3, the classifier training module 34 receives as input a training sequence 40 comprising a set s= 1, . . . , N of independent time sequences of information $\{(x^{(s)}y^{(s)})_{1:n^{(s)}}\}_{s=1}^{N}$ extracted from the monitoring log 30. The s time sequences may, for example, correspond to logs of different devices. A supervised machine learning module 42 optimizes parameters of a parameterized classifier employing a hidden Markov model (HMM) 46 as set forth herein with reference to Equations (1)-(6) to generate trained classifier parameters 48. That is, the supervised machine learning module 42 performs the learning process:

$$\{(x^{(s)}y^{(s)})_{1:n^{(s)}}\}_{s=1}^{N} \xrightarrow{Learning} \Theta = \langle \underbrace{K\mu}_{aggregator}, \underbrace{\rho}_{state\,dyn.}, \underbrace{\theta_{(1:K)(1:D)}}_{X-emission}, \underbrace{\beta_{1:K}}_{Y-emission} \rangle, \tag{7}$$

where $\Theta$ denotes the trained classifier parameters 48.

An illustrative example of a suitable supervised machine learning algorithm employing the expectation-maximization (EM) process is described. First consider the case where the structural parameters K (that is, the number of states) and µ (the aggregator parameter) are set. The model of FIG. 2 is designed in such a way that the learning of the event component models $Z \to X^{(d)}$ on the one hand and that of the linear classifiers Z, $\tilde{X} \to Y$ on the other hand, can be done in a modular fashion (although not independently). The EM algorithm can be used here, and more precisely its version for HMM called Baum-Welch (see Rabiner, "A tutorial on hidden markov models and selected applications in speech recognition", in Proceedings of the IEEE vo. 77 no. 2, pp. 257-86 (1989)), with Z as state variable and XY as emission. For parameter ρ characterizing the discrete state dynamic, no constraint is imposed on the parameter, meaning that any state can a priori be reached from any other state or itself. On the side of the emission parameters, the Baum-Welch algorithm entails defining two operations, one in the E-step and one in the M-step, as follows.

In the E-step, given a sequence of points in the emission space (i.e. that of XY), compute for each point and each possible value k of Z the probability (or density) at the end point, given Z=k at that point and given the current values of the parameters $\beta_k \theta_{k(1:D)}$. By combining Equations (4) and (5), an expression is obtained of $P((XY)_n|Z_n(XY)_{1:n-1})$.

In the M-step, given an empirical distribution in the emission space for each possible value k of Z, compute the parameters $\beta_k \theta_{k(1:D)}$ which best fit that distribution (that is, which minimize the KL divergence). This can be solved independently for each of the parameters. For $\theta_{kd}$ the problem is specific to the family of distribution used for component d and any fitting method suitable for that family can be modularly plugged into the iterations. For $\beta_k$, the fitting problem is one of logistic regression.

In the M-step, the solution can be inexact. Exploiting the property of generalized EM, it is sufficient to increase the objective with respect to the current parameters rather than actually maximize it. This is particularly relevant if any of the independent fit tasks in the M-step is obtained by an anytime iterative process. In that case, the number of iterations can be bounded arbitrarily, rather than by waiting for the variation in objective to go under a threshold, as is usually done. For standard simple distributions such as multinomials, Poisson, normals, log-normals, and so forth, there exist analytical formulas to estimate the parameters. On the other hand, the estimation of the coefficients of a logistic regression is usually based on a convex optimization algorithm which is iterative. For example, a variational method based on a tight bound of the logistic sigmoid is suggested in Jaakkola et al., "A variational approach to bayesian logistic regression problems and their extensions", in Proc. of 6th International Workshop on Artificial Intelligence and Statistics, Fort Lauderdale, Fla. (1997). As any variational method, it is iterative, and increases the objective at each iteration. It is therefore suitable to exploit the generalized EM property mentioned above. If $(xy)_{1:n}$ is the data to fit (each $x_i$ having an extra component set to 1) and $\beta$ is the parameter to estimate (vector of coefficients including intercept), the method introduces a set $\xi_{1:n}$ of variational parameters and the alternated update formulas are given, using a matrix inversion, by:

$$\beta^* = \left(\sum_{i=1}^{n} \frac{\tanh(0.5\xi_i)}{\xi_i} x_i x_i^T\right)^{-1} \sum_{i=1}^{n} y_i x_i \tag{8}$$

and $$\xi_i^* = y_i \beta^T x_i. \tag{9}$$

The structural parameters µ, K can be chosen empirically or learnt from the data by systematic enumeration. To avoid overfitting, the BIC criterion (see Schwartz, "Estimating the dimension of a model", Annals of Statistics, vol. 6 no. 2 pp. 461-64 (1978)) can be used as the objective:

$$\mu^* K^* = \underset{\mu K}{\operatorname{argmin}}\{-2\log L(K, \mu) + F(K)\log N\}, \quad (10)$$

where $L(K, \mu)$ is the maximized likelihood of the data in the model with an aggregator controlled by $\mu$ and K states, $F(K)$ is its degree of freedom, given by Equation (6), and N is the number of independent instances (here the number of time series in the training data).

Figure 4:
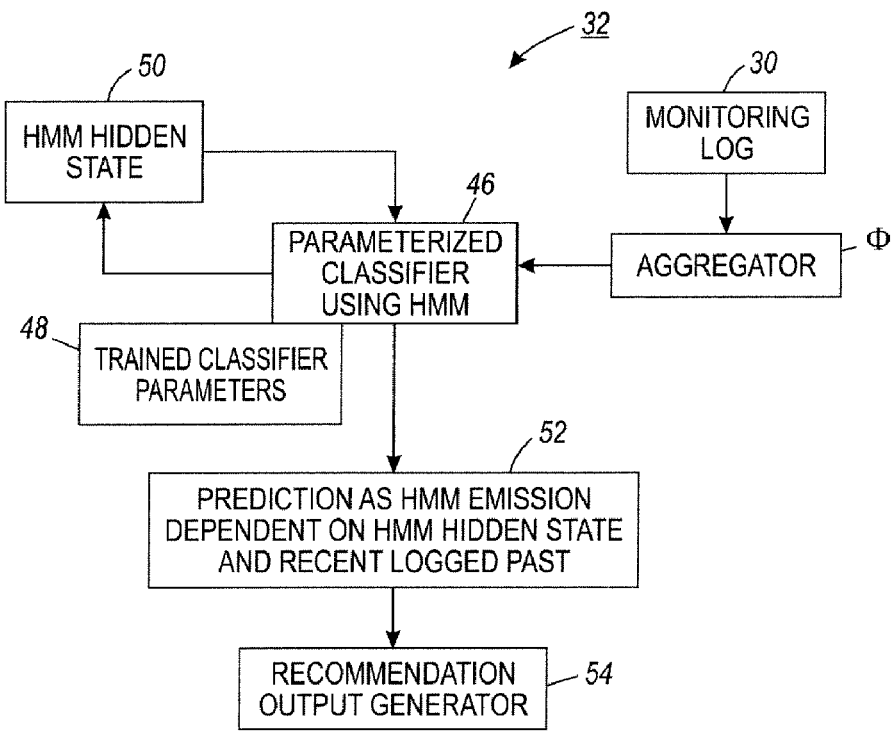
FIG. 4 diagrammatically shows the classifier module of FIG. 1.

With reference to FIG. 4, an illustrative embodiment of the classifier module 32 which uses the parameterized classifier employing a hidden Markov model (HMM) 46 with the trained classifier parameters 48 is described. IN brief, the classifier module 32 performs the inference operation:

$$\Theta x_{1:n} y_{1:n-1} \xrightarrow{\text{Inference}} \hat{y}_n, \quad (11)$$

where $\Theta$ is the trained classifier parameters 48, $x_{1:n}$ represents the observations logged in the monitoring log 30, $y_{1:n-1}$ represents the past (correct) action recommendations (that is, the reference decisions) logged in the monitoring log 30, and $\hat{y}_n$ represents the current action recommendation to be generated by the classifier module 32. The inference operation of Equation (11) utilizes the HMM 46 comprising the trained classifier 32, 34, the hidden state 50 of the monitored device, network, or system, and the selected portion of the time sequence of information to generate a classification value or prediction $\hat{y}_n$ 52. In the illustrative embodiment, the classification value or prediction $\hat{y}_n$ 52 has a value of either −1 or 1 representing whether or not an action including investigation should be taken. Preferably, a recommendation output generator 54 formats the classification value or prediction $\hat{y}_n$ 52 into a more human-friendly output for display to a human dispatcher or other user; or, alternatively or additionally, the recommendation output generator 54 may format the classification value or prediction $\hat{y}_n$ 52 into a suitable input for the automated dispatcher 36.

In some suitable embodiments, the inference relies on the computation of a coefficient of HMM according to:

$$\alpha_k = ((XY)_{1:n} = p((XY)_{1:n} Z_n = k \quad (12).$$

There exists standard formulas to incrementally compute the vector $\alpha_{1:K}$ (see, e.g., Rabiner, "A tutorial on hidden markov models and selected applications in speech recognition"). For a given n, let Y' be the same sequence as Y except for the last element $Y_n' = -Y_n$. Then it follows:

$$p(Y_n \mid X_{1:n} Y_{1:n-1}) = \frac{p(X_{1:n} Y_{1:n})}{p(X_{1:n} Y_{1:n-1})} = \frac{p((XY)_{1:n})}{p((XY)_{1:n}) + p((XY')_{1:n})}, \quad (13)$$

$$p((XY)_{1:n}) = \sum_k p((XY)_{1:n} Z_n = k) = \sum_k \alpha_k((XY)_{1:n}), \quad (14)$$

and $$\alpha_k((XY')_{1:n}) = p(Y_n' \mid X_{1:n} Y_{1:n-1} Z_n = k) p(X_{1:n} Y_{1:n-1} Z_n = k), \quad (15)$$

where Equation (15) can be written as:

$$\alpha_k((XY')_{1:n}) = \frac{p(Y_n' \mid X_{1:n} Y_{1:n-1} Z_n = k)}{p(Y_n \mid X_{1:n} Y_{1:n-1} Z_n = k)} \alpha_k((XY)_{1:n}). \quad (16)$$

Putting the foregoing together and simplifying, and replacing the Y|X̃ dependency by its logistic regression expression yields:

$$p(Y_n \mid X_{1:n} Y_{1:n-1}) = \frac{\sum_k \alpha_k((XY)_{1:n})}{\sum_k \frac{1}{\sigma(Y_n \beta_k^T \tilde{X}_n)} \alpha_k((XY)_{1:n})}. \quad (17)$$

The prediction $\hat{y}_n$ is then obtained by comparing the conditional probability given by Equation (17) to a threshold. If the objective is to maximise the accuracy of the classification, then the threshold is simply set to 0.5. If the precision of the classification for one of the classes is to be favoured, then the threshold can be determined by a ROC curve analysis, where the ROC curve is determined, for example, by cross validation.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A monitoring method comprising:
   recording a time sequence of information pertaining to a monitored device, network, or system comprising observations of and actions taken respective to the monitored device, network, or system;
   maintaining a hidden Markov model (HMM) operating on the time sequence of information and comprising a hidden state of the monitored device, network, or system;
   classifying a current state of the monitored device, network, or system using a classification value comprising an emission of the HMM that depends on the hidden state and on a selected portion of the time sequence of information, wherein the classifying includes aggregating the selected portion of the time sequence of information as an information representation of fixed dimensionality, the classification value comprising the emission of the HMM depending on the information representation of fixed dimensionality;
   generating an action recommendation for the current state of the monitored device, network, or system based on the classification value;
   wherein at least the maintaining, the aggregating, and the classifying are performed by a digital processor.

2. The method as set forth in claim 1, wherein the aggregating comprises:
   generating the information representation using a sliding window aggregator having at least a selected window size applied to the time sequence of information.

3. The method as set forth in claim 1, wherein the selected portion of the time sequence of information includes past observations, a current observation, and known prior correct action recommendations for the monitored device, network, or system.

4. A monitoring method comprising:
   recording a time sequence of information pertaining to a monitored device, network, or system comprising observations of and actions taken respective to the monitored device, network, or system;

maintaining a hidden Markov model (HMM) operating on the time sequence of information and comprising a hidden state of the monitored device, network, or system;

classifying a current state of the monitored device, network, or system using a classification value comprising an emission of the HMM that depends on the hidden state and on a selected portion of the time sequence of information, wherein the classifying comprises generating information components of fixed dimensionality representing the selected portion of the time sequence of information and (ii) applying a linear classifier to the information components of fixed dimensionality wherein the hidden state selects coefficients of the linear classifier; and generating an action recommendation for the current state of the monitored device, network, or system based on the classification value;

wherein at least the maintaining and the classifying are performed by a digital processor.

5. The method as set forth in claim 4, wherein the linear classifier comprises a binary logistic regression classifier, the classification value is a binary value, and the generated action recommendation indicates whether a remedial action comprising at least investigation should be undertaken for the monitored device, network, or system.

6. The method as set forth in claim 4, further comprising:
training parameters of the HMM and the HMM state dependent coefficient vectors of the linear classifier based on a training time interval of the recorded time sequence of information.

7. The method as set forth in claim 6, wherein the trained parameters of the HMM comprise state dynamics parameters controlling time evolution of the hidden state and emission parameters relating the hidden state and observations of the monitored device, network, or system.

8. The method as set forth in claim 6, wherein the training further trains parameters of an aggregator that selects and formats the selected portion of the time sequence of information.

9. A monitoring method comprising:
recording a time sequence of information pertaining to a monitored printing device or printing network, the time sequence of information comprising observations of and actions taken respective to the monitored printing device or printing network;

maintaining a hidden Markov model (HMM) operating on the time sequence of information and comprising a hidden state of the monitored printing device or printing network;

classifying a current state of the monitored printing device or printing network using a classification value comprising an emission of the HMM that depends on the hidden state and on a selected portion of the time sequence of information; and generating an action recommendation for the current state of the monitored printing device or printing network based on the classification value, wherein the generated action recommendation indicates whether a remedial action comprising at least investigation should be undertaken for the monitored printing device or printing network;

wherein at least the maintaining and the classifying are performed by a digital processor.

10. The method as set forth in claim 9, wherein the generating an action recommendation is selected from a group consisting of:

displaying a human-perceptible representation of the action recommendation, and inputting the action recommendation to an automated dispatcher which takes remedial action conditional on the action recommendation indicating a remedial action comprising at least investigation should be undertaken for the monitored printing device or printing network.

11. A monitoring system comprising:
a monitoring module comprising a computer configured to maintain a monitoring log recording a time sequence of information pertaining to a monitored device, network, or system comprising observations of and actions taken respective to the monitored device, network, or system; and a classifier module comprising the computer further configured to generate an action recommendation classification based on an estimate of the distribution of a current hidden state of the monitored device, network, or system, a current observation of the monitored device, network, or system, and a selected portion of the time sequence of information prior to the current observation of the monitored device, network, or system.

12. The monitoring system as set forth in claim 11, wherein the classifier module comprises:

an aggregator configured to generate an information representation of fixed dimensionality representing the current observation of the monitored device, network, or system, and the selected portion of the time sequence of information prior to the current observation of the monitored device, network, or system.

13. The monitoring system as set forth in claim 11, wherein the classifier module comprises a digital processor configured to perform a classification method comprising:

generating information components of fixed dimensionality representing the current observation and the selected portion of the time sequence of information prior to the current observation; and applying a linear classifier to the information components of fixed dimensionality to generate the action recommendation classification wherein the hidden state selects coefficients of the linear classifier.

14. The monitoring system as set forth in claim 13, wherein the linear classifier comprises a binary logistic regression classifier and the generated action recommendation classification indicates whether a remedial action comprising at least investigation should be undertaken for the monitored device, network, or system.

15. The monitoring system as set forth in claim 11, wherein the monitored device, network, or system comprises a printing device or printing network.

16. The monitoring system as set forth in claim 11, wherein the classifier module is configured to generate the hidden state of the monitored device, network, or system using a hidden Markov model (HMM).

17. A non-transitory storage medium storing instructions executable by a digital processor to perform an assessment process for assessing a time sequence of information pertaining to a monitored device, network, or system comprising observations of the monitored device, network, or system and actions taken respective to the monitored device, network, or system, the assessment process comprising:

classifying a current state of a monitored device, network, or system based on an estimate of the distribution of a current hidden state of the monitored device, network, or system and a representation of fixed dimensionality of a current observation and a selected portion of the time sequence of information preceding the current observation in the time sequence;
generating an action recommendation based on the classifying; and
one of (i) displaying the action recommendation and (ii) inputting the action recommendation to an automated dispatcher which takes remedial action respective to the monitored device, network, or system conditional upon the action recommendation.

18. A non-transitory storage medium storing instructions executable by a digital processor to perform an assessment process for assessing a time sequence of information pertaining to a monitored device, network, or system comprising observations of the monitored device, network, or system and actions taken respective to the monitored device, network, or system, the assessment process comprising:

classifying a current state of a monitored device, network, or system based on an estimate of the distribution of a current hidden state of the monitored device, network, or system and a representation of fixed dimensionality of a current observation and a selected portion of the time sequence of information preceding the current observation in the time sequence, wherein the classifying comprises applying a linear classifier to the representation of fixed dimensionality of the current observation and the selected portion of the time sequence of information preceding the current observation in the time sequence wherein coefficients of the linear classifier are determined by the current hidden state; and generating an action recommendation based on the classifying.

* * * * *